(12) United States Patent
Kremsler et al.

(10) Patent No.: US 6,467,990 B1
(45) Date of Patent: Oct. 22, 2002

(54) ARRANGEMENT FOR SECURING A COMPONENT

(75) Inventors: Dieter Kremsler, Spiegelberg; Wolfgang Weissert, Winnenden, both of (DE)

(73) Assignee: Andreas Stihl AG & Co. (DE)

( * ) Notice: Subject to any disclaimer, the term of this patent is extended or adjusted under 35 U.S.C. 154(b) by 0 days.

(21) Appl. No.: 09/668,433

(22) Filed: Sep. 22, 2000

(30) Foreign Application Priority Data

Sep. 22, 1999 (DE) .................................... 299 16 682 U

(51) Int. Cl.⁷ ............................................... F16B 21/08
(52) U.S. Cl. .................... 403/408.1; 411/999; 411/970; 411/353; 411/512
(58) Field of Search ...................... 403/408.1; 411/999, 411/970, 352, 353, 512, 542, 544

(56) References Cited

U.S. PATENT DOCUMENTS

| | | | |
|---|---|---|---|
| 5,920,959 A | * | 7/1999 | DeMarco ................. 411/512 X |
| 6,164,684 A | * | 12/2000 | Lehman ............... 403/408.1 X |
| 6,173,969 B1 | * | 1/2001 | Stoll et al. ............... 411/372 X |
| 6,227,784 B1 | * | 5/2001 | Antoine et al. ......... 411/353 X |

* cited by examiner

Primary Examiner—Lynne H. Browne
Assistant Examiner—John Cottingham
(74) Attorney, Agent, or Firm—R W Becker & Associates; R W Becker

(57) ABSTRACT

An arrangement for securing a component on a bolt is provided, wherein a shaft of the bolt extends through an opening of the component. A ring is disposed on the shaft, and is secured against axial displacement on a surface of the shaft. The ring has at least one radially extending widened portion that inter-engages an edge of the opening of the component.

18 Claims, 2 Drawing Sheets

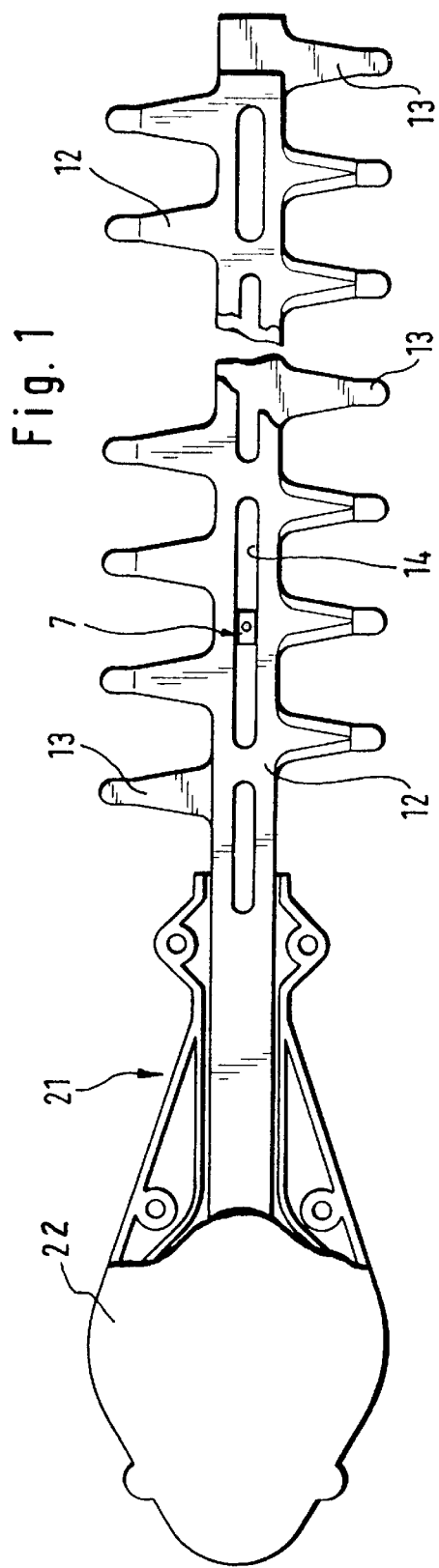
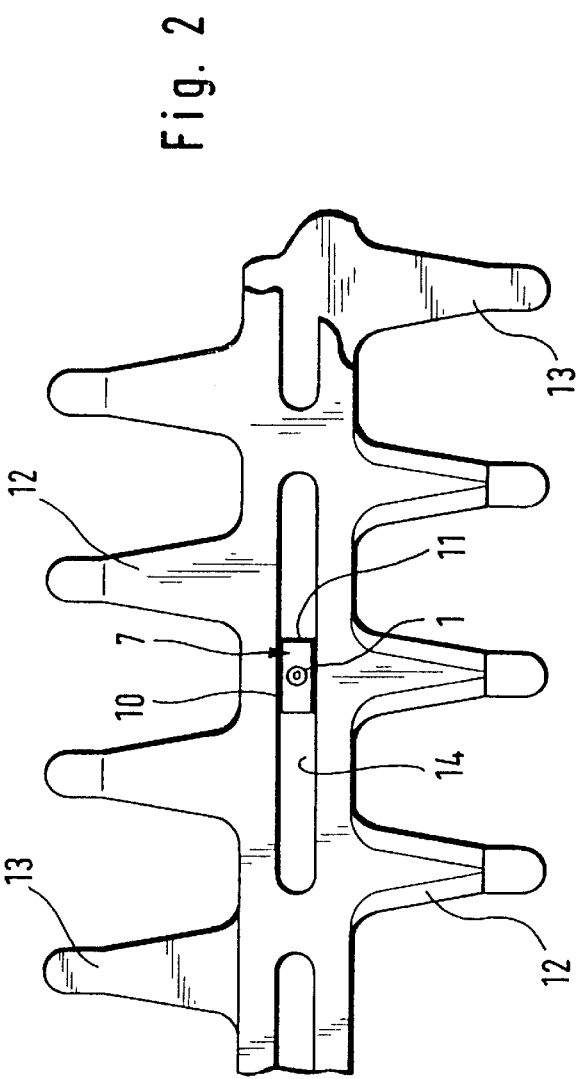

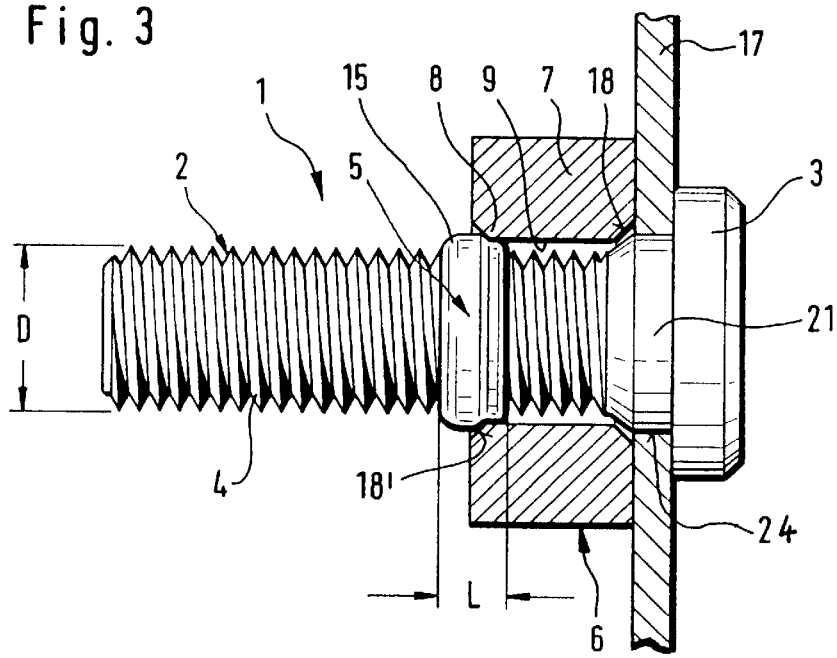
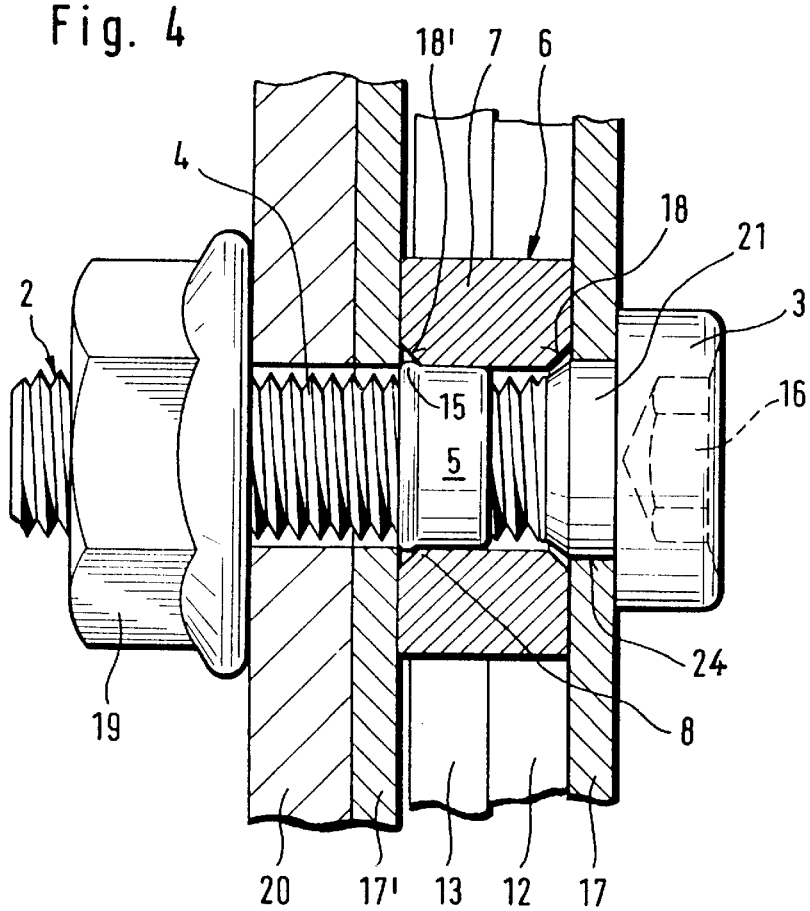

ARRANGEMENT FOR SECURING A COMPONENT

BACKGROUND OF THE INVENTION

The present invention relates to an arrangement for securing a component on a bolt, wherein a shaft of the bolt extends through an opening of the component.

During the assembly of components, frequently the problem is faced that a plurality of parts are disposed on a bolt, with a final fixation of the parts upon the bolt being effected only later. It is frequently difficult to hold the various parts on the bolt prior to the final fixation, so that parts can become lost and errors in assembly occur. In particular during servicing, the entire arrangement is frequently placed in a position where the clamping or tightening means are accessible from above for loosening, so that when the tightening means is removed entirely, the bolt can fall out. In so doing, the components that were previously disposed on the bolt also lose their exact position, so that extra time is needed in order to properly assemble the parts.

It is therefore an object of the present invention to provide an arrangement for securing a component on a bolt according to which in a straightforward manner a plurality of elements can also be secured on the bolt.

BRIEF DESCRIPTION OF THE DRAWINGS

This object, and other objects and advantages of the present invention, will appear more clearly from the following specification in conjunction with the accompanying schematic drawings, in which:

FIG. 1 illustrates part of a hedge clipper;

FIG. 2 is an enlarged view of a portion of the hedge clipper;

FIG. 3 is an axial cross-sectional view through one exemplary embodiment of an inventive arrangement for securing components during assembly;

FIG. 4 is an axial cross-sectional view through a completely mounted and finally fixed arrangement; and FIG. 5 shows a portion of the region of the bolt on which the ring is disposed.

SUMMARY OF THE INVENTION

The arrangement of the present invention for securing a component on a bolt is characterized primarily by a ring that is disposed on the shaft of the bolt, wherein the ring is secured against axial displacement on a surface of the shaft, and wherein the ring has at least one radially extending widened portion that inter-engages an edge of the opening of the component.

The inventive solution is surprisingly simple yet extremely reliable. The necessary costs are slight, since the ring is made of an inexpensive material that is easy to place on, whereby the ring can be prefabricated or during the initially assembly can be applied as a flowable material that cures in a short period of time. No change of the components that are to be assembled is necessary since a radially extending widened portion of the ring inter-engages with or behind an otherwise present edge on a component that is to be secured.

The ring is preferably made of an elastic material, especially a polyamide. To apply the ring to the shaft of the bolt, several possibilities present themselves. For example, the ring can be pressed on, the material thereof can be injected onto the shaft, or the ring can be shrink fitted thereon.

The component with which the ring cooperates can, for example, be a sleeve; however, other shapes of the component are also possible, whereby such components naturally have an appropriate opening or bore through which the shaft of the bolt extends. The inventive securement is particularly expedient for a component that serves as a sliding member for hedge clipper blades that are displaceable relative to one another. In this connection, the sliding member has an essentially rectangular shape, with the ratio of the side edges of the sliding member being approximately 1:1.5 to 1:2.

The bolt can be provided with a head as well as with a threaded portion, whereby a nut can be threaded onto the threaded portion as a tightening means. It is, however, also possible to screw the bolt into a threaded bore of a receiving member. It is also possible for the head to be embodied for the application or insertion of a tool. To the extent that the bolt does not require a threaded portion, the surface thereof can be essentially smooth, whereby an annular groove is preferably provided in the region of the ring so that a positive fixation of the ring upon the bolt is provided.

So that the component or sliding member can be held on the shaft of the bolt in a manner free from play, it is expedient that a portion of the axial length of the ring be disposed within the opening of the component, with the wall of the opening resting against the ring. The radially extending widened portion of the ring is expediently in the form of a bead that engages in a preferably tapered or conically widened part on the end face of the opening. Due to the elasticity of the material of the ring, by applying pressure to the outwardly disposed end face of the ring in an axial direction, the material of the ring is pressed further into the tapered or conical widened portion. If the inventive arrangement is utilized on a hedge clipper, it is expedient that respective steel plates as guide elements be disposed on the end faces of the sliding member; one of these guide elements is clamped between the head of the bolt and the sliding member.

Further specific features of the present invention will be described in detail subsequently.

DESCRIPTION OF PREFERRED EMBODIMENTS

Referring now to the drawings in detail, FIG. 1 shows a portion of a hedge trimmer or clipper 21 having a transmission housing 22 in which are received the ends of blades 12 and 13. Provided in the blades 12, 13 are slots 14 in which is disposed a sliding member 7, which in plan has an essentially rectangular contour.

FIG. 2 is an enlarged view of a portion of the blades 12 and 13 shown in FIG. 1 along with the slot 14 provided therein. Long side edges 10 of the sliding member 7 rest against the longitudinal sides of the slot 14, whereby the amount of undersize of the sliding member, in other words the dimensions of the short side edges 11 relative to the spacing of the longitudinal sides of the slot 14, is selected such that a displacement of the blades 12, 13 relative to the sliding member 7 encounters limited friction. The center of gravity of the sliding member 7 has a bore through which projects a bolt 1 that is held on a component that is fixed relative to the transmission housing 22 of FIG. 1.

FIG. 3 is an axial cross-sectional view through one arrangement for securing a component 6 on a shaft of the bolt 1. In this connection, the component 6 could be the sliding member 7 of FIGS. 1 and 2, although it is just as possible for this component 6 to have a different outer contour, and to have, for example, the shape of a sleeve. One end of the shaft 2 of the bolt 1 is provided with a head 3, adjoining which is a portion 21 that is disposed in an opening 24 of a guide element 17. The outer circumference of the portion 21 of the bolt 1 is adapted to the dimension of the opening 24, so that the bolt 1 is held in the opening 24 in a manner free of play. The shaft 2 of the bolt 1 is provided with an external thread 4. The component 6 or sliding member 7 rests against that side of the guide element 17 that is remote from the head 3 of the bolt 1; an axial end face of the component 6 or sliding member 7 rests directly against the guide element 17. The sliding member 7 has an opening or bore 9, which near both end faces of the sliding member is provided with a respective tapered or conically widening part 18, 18'.

A ring 5 made of elastic material is disposed on the threaded shaft 2, whereby the axial length L of the ring 5 can be 0.4 times the diameter D of the shaft 2. It is to be understood that other ratios could also be selected, whereby the axial length L of the ring 5 is expediently between 0.2 to 0.6 times the diameter D of the shaft 2. As clearly shown in FIG. 3, a portion of the axial length L of the ring 5 is disposed within the bore 9 of the sliding member 7. Next to the edge 8, the ring 5 forms a radial bead 15 that extends into the tapered widened part 18 and is also disposed partially beyond the axial length of the sliding member 7. Due to the positive engagement of the radial bead 15 as well as the edge 8 of the sliding member 7, an axial movement of the component 6 is no longer possible, since at the other side the component 6 rests against the guide element 17, which in turn rests against the head 3 of the screw or bolt 1. The individual parts illustrated in FIG. 3 therefore have a defined position relative to one another which is maintained until the final fixation of the arrangement is effected.

FIG. 4 shows the final mounted arrangement, and in particular again by way of example in conjunction with a hedge clipper. The embodiment illustrated in FIG. 4 essentially corresponds to that of FIG. 3, and therefore the same reference numerals are used for the same parts. The component 6 or sliding member 7 is disposed in the slots of two blades 12 and 13 that are alternatively moveable relative to one another. Disposed on that end face of the sliding member 7 that is remote from the bolt head 3 is a further guide element 17' that is preferably identical to the guide element 17 on the other side of the sliding member 7. Adjoining the guide element 17' is a cutting guard 20, the free flat side of which is acted on by the force of a nut 19. Thus, by turning the nut 19, the entire arrangement is held or secured on the shaft 2 between the bolt head 3 and the nut 19. As can furthermore be clearly seen from FIG. 4, the greatest part of the ring 5 is disposed within the bore 9 of the component 6, and merely a part of only slight axial length of the ring 5 is disposed in the region within the tapered widened part 18'. The positive engagement of the ring 5 with the component 6 is, however, maintained since the radial bead 15 continues to engage behind the edge 8 of the sliding member 7. It can also be seen from FIG. 4 that the head 3 has a hexagonal recess 16 that serves for the engagement of a tool.

FIG. 5 shows a portion of the bolt 1 having an annular groove 23. The ring 5 is disposed on the bolt 1 in this region. Due to its elasticity, or the process during assembly, the material of the ring 5 extends into the annular groove 23 and preferably fills it. This results in a very good securement against displaceability of the ring 5.

The specification incorporates by reference the disclosure of German priority document 299 16 682.1 of Sep. 22, 1999.

The present invention is, of course, in no way restricted to the specific disclosure of the specification and drawings, but also encompasses any modifications within the scope of the appended claims.

What we claim is:

1. An arrangement for securing a component on a bolt, wherein a shaft of said bolt extends through an opening of said component, comprising:

a ring disposed on said shaft of said bolt, wherein said ring is secured against axial displacement on a surface of said shaft, and wherein said ring has at least one radially extending widened portion that inter-engages an edge of said opening of said component.

2. An arrangement according to claim 1, wherein said ring is made of an elastic material.

3. An arrangement according to claim 2, wherein said ring is made of polyamide.

4. An arrangement according to claim 2, wherein said ring is pressed onto, injected onto, or shrunk fit onto said shaft of said bolt.

5. An arrangement according to claim 2, wherein said component is a sleeve.

6. An arrangement according to claim 2, wherein said component is a sliding member for blades that are displaceable relative to one another.

7. An arrangement according to claim 2, wherein said sliding member has an essentially rectangular shape, with the ratio of side edges of said sliding member being approximately 1:1.5 to 1:2.

8. An arrangement according to claim 2, wherein said bolt is provided with a head.

9. An arrangement according to claim 8, wherein said head of said bolt is provided with means for cooperation with a tool.

10. An arrangement according to claim 8, wherein said bolt has an essentially smooth surface.

11. An arrangement according to claim 2, wherein in the region of said ring said shaft of said bolt is provided with an annular groove.

12. An arrangement according to claim 2, wherein at least a portion of said shaft of said bolt is provided with an external thread, and wherein said bolt is adapted to be screwed into a threaded bore of a receiving member.

13. An arrangement according to claim 2, wherein a part of an axial length of said ring is disposed within said opening of said component, and wherein a wall of said opening rests against said ring.

14. An arrangement according to claim 2, wherein said radially extending widened portion is an annular bead.

15. An arrangement according to claim 14, wherein said opening of said component is provided with a tapered or conical widened part at one end face of said component, and wherein said annular bead inter-engages in said widened portion.

16. An arrangement according to claim 6, wherein a respective steel plate is disposed as a guide element at each end face of said sliding member, and wherein one of said guide elements is clamped between a head of said bolt and said sliding member.

17. An arrangement according to claim 2, wherein said ring has an axial length that is about 0.2 to 0.6 times a diameter of said shaft.

18. An arrangement according to claim 1, wherein said at least one radially extending widened portion of said ring inter-engages behind said edge of said opening of said component.

* * * * *